United States Patent [19]

Ikenoue et al.

[11] Patent Number: 5,029,109
[45] Date of Patent: Jul. 2, 1991

[54] IMAGE FORMING DEVICE WITH A SMALL SIZED MEMORY DEVICE EMPLOYING A BIT MAP ASSIGNMENT SYSTEM

[75] Inventors: Yoshikazu Ikenoue; Nobuo Kamei; Motomi Kawamura, all of Osaka, Japan

[73] Assignee: Minolta Camera Kabushiki Kaisha, Osaka, Japan

[21] Appl. No.: 482,859

[22] Filed: Feb. 22, 1990

[30] Foreign Application Priority Data

Feb. 23, 1989 [JP] Japan ................................. 1-44047
Feb. 23, 1989 [JP] Japan ................................. 1-44048
Feb. 23, 1989 [JP] Japan ................................. 1-44049
Feb. 23, 1989 [JP] Japan ................................. 1-44050

[51] Int. Cl.[5] .......................................... G06K 15/00
[52] U.S. Cl. ................................ 364/519; 364/964.1
[58] Field of Search .......................... 364/518–520, 364/235 MS, 930 MS, 964.1, 964; 340/732, 735, 721, 723, 750; 346/154

[56] References Cited

U.S. PATENT DOCUMENTS 3,944,989 3/1976 Kaisha .................................. 364/900
4,692,757 9/1987 Tsuhaka .............................. 340/721

*Primary Examiner*—Arthur G. Evans
*Attorney, Agent, or Firm*—Burns, Doane, Swecker & Mathis

[57] ABSTRACT

An image forming device is provided with a memory area assignment system for assigning a font load area for storing font data and a bit map area for storing image data in the memory area with a predetermined capacity, and when a part of the memory area defined to be assigned for the bit map area is overlapped on a part of the font load area, it is judged whether or not the font data stored in the overlapped area is a secondary data which can be recovered by converting a primary data, and in case in font data is a secondary data, the overlapped area is assigned for the bit map area.

16 Claims, 9 Drawing Sheets

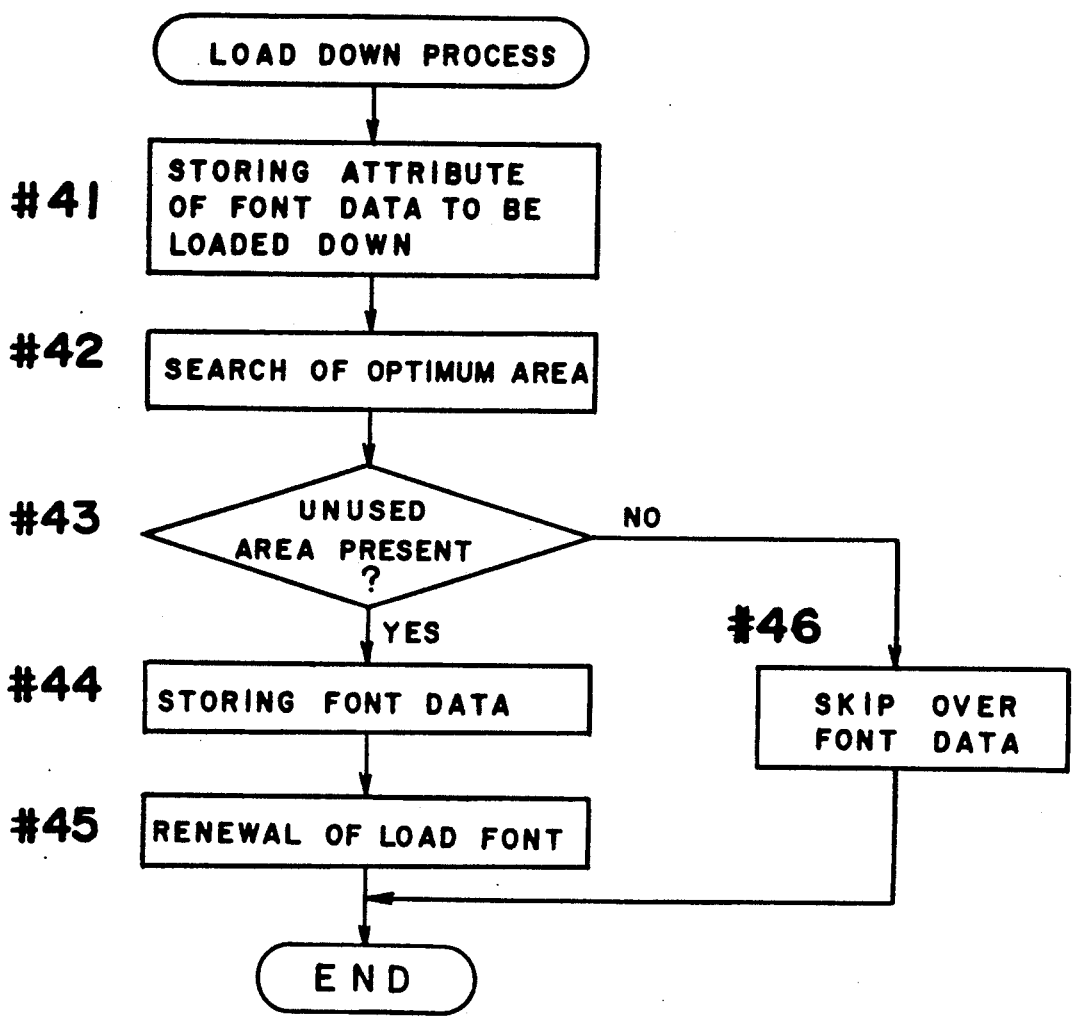
Fig. 7
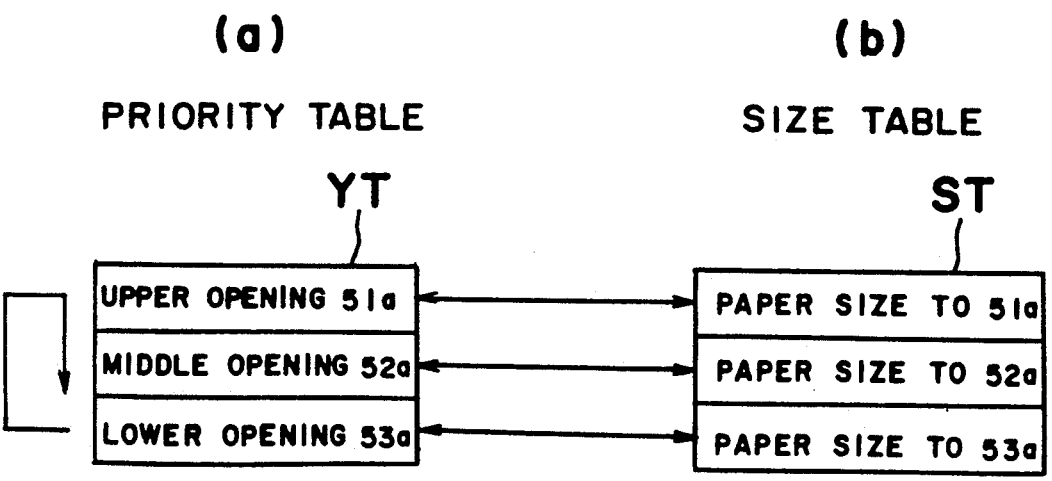
Fig. 8 (a) PRIORITY TABLE YT
Fig. 8 (b) SIZE TABLE ST

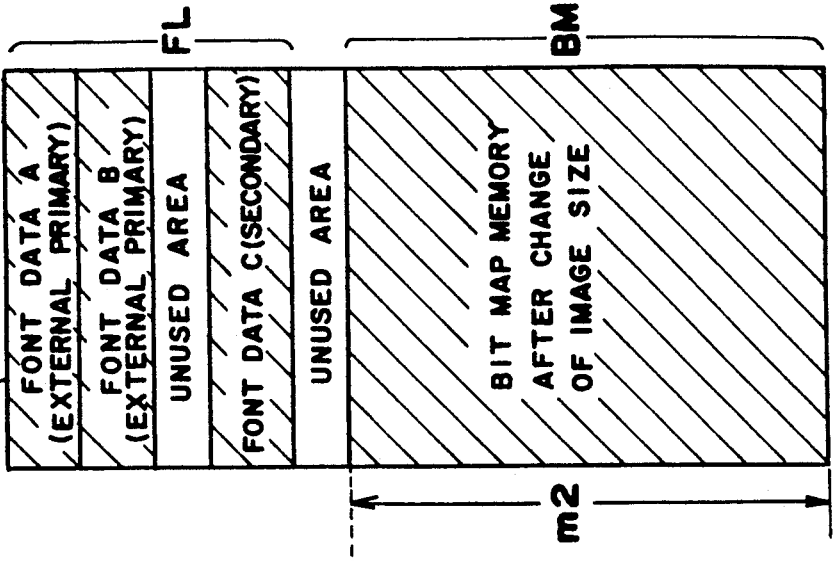
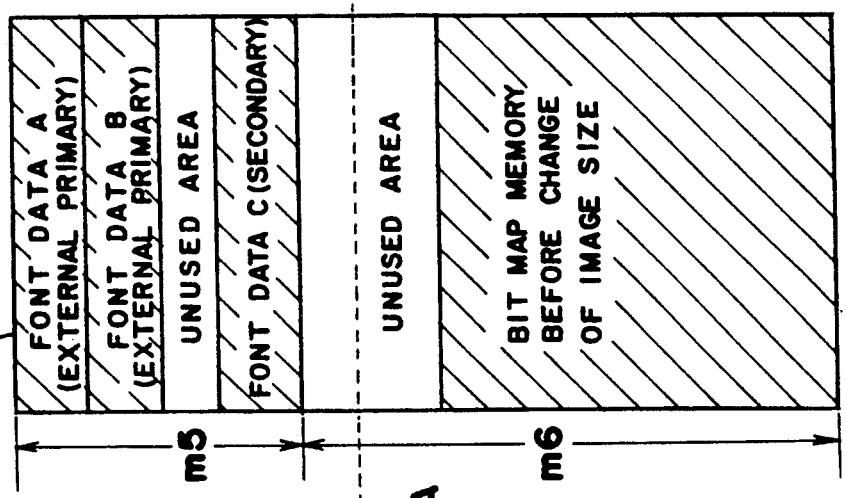
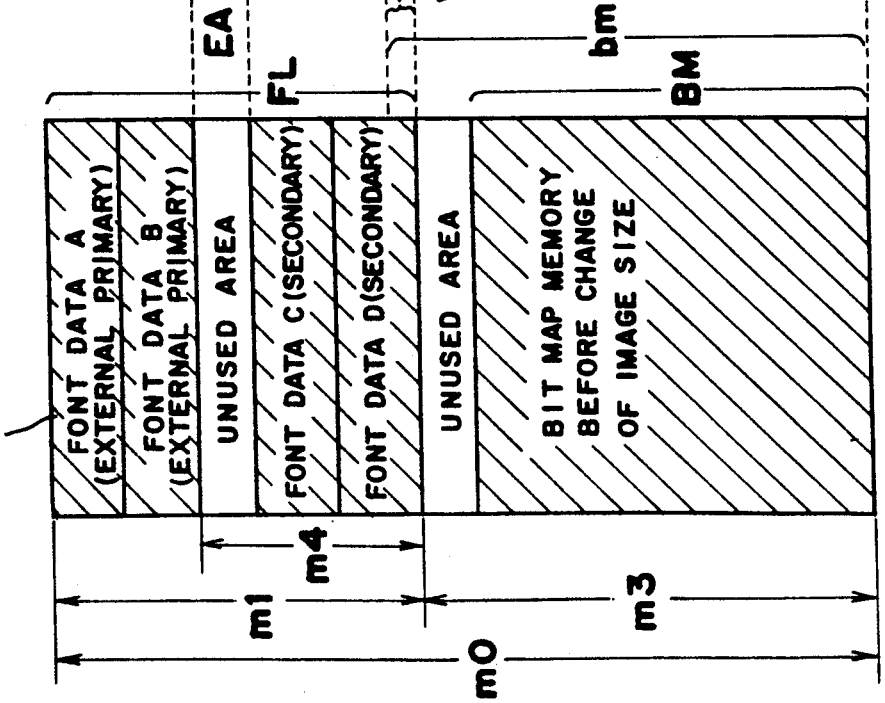

IMAGE FORMING DEVICE WITH A SMALL SIZED MEMORY DEVICE EMPLOYING A BIT MAP ASSIGNMENT SYSTEM

BACKGROUND OF THE INVENTION

1. Field of the Invention

The present invention relates to an image forming device for forming image data on the basis of font data and image data with a memory assignation system, so called a bit map system for storing the font data and image data. The image is formed on the basis of the font data and image data.

2. Description of the Prior Art

An image forming operation is performed by adopting so called a bit map system in a graphic display device or a laser printer employing a laser optical system and electrophotographic system. In such a bit map system there is provided an image memory (bit map memory) having its capacity for suitably storing image element data (referred to as image data hereinafter) generally corresponding to the volume of one page data. The image data sent from an external device such as a host computer or word processor are once depicted in the bit map memory. In case that the image data is a character code, the image data is depicted in the bit map memory with reference to the font data stored in the font memory.

In the bit map system, although it is required to provide an expensive bit map memory with a large capacity, the bit map system has an advantage that it is possible to finely control the location, direction, shape and size of a character included in the image and also possible to depict any image information besides the character data.

In the font memory, there are previously stored font data of generally a standard style of type (penmanship) such as Ming type or Gothic type. In the case of forming an image including a character style other than the standard style such as a character created by user or brush writing style, necessary font data are loaded down from an external device so as to be stored in a font load area in the font memory.

In the conventional memory assignation system, the bit map area for use as a bit map memory storing image data is independent of the font load area for use as a font memory. In other words, there are provided a memory area with a predetermined capacity as a bit map area as mentioned above and also provided another memory area with a predetermined capacity as a font load area whose data is accessed by an address system other than the address system for accessing the image data stored in the bit map area, so that there are secured two memory areas each having a predetermined capacity for storing a predetermined amount of data in the bit map area and font load area respectively.

Therefore, the amount of the total capacity of the memory areas is increased so that a large capacity memory device is required. In other words, in many cases of image forming, there is an empty or blank area without a data stored, so that there is a problem that the efficiency of utilizing the memory area is low.

For example, in such a large capacity memory device provided with a font load area capable of storing some kinds of font data for forming an image composed of some kinds of character styles, when an image of only the standard character style is formed, since it is not necessary to store a font data sent from the external device into the font load area, the font load area is not used. On the other hand, when a small image is formed and printed onto a sheet of small size paper, since the amount of the image data is small, there occurs a blank area in the bit map area.

In order to solve the problem mentioned above, there has been considered a memory assignation system having a memory area of the same address system in common use for storing both font data and image data. That is to say, according to the volumes of the respective font and image data, the font load area and the bit map area are appropriately expanded or reduced by controlling the assigned memory area.

However, in this system, since the expanding range of the respective areas is limited in the memory area having a limited capacity, it has been difficult to store both of the font and image data in a common memory area in practice.

SUMMARY OF THE INVENTION

In order to solve the problem mentioned above, the present invention has been made and an essential object of the present invention is to provide an image forming device having a memory area assignment system which is capable of increasing the efficiency of utilizing a memory area and reducing the total volume of the memory area.

According to the feature of the present invention, the improvement is an image forming device employing a memory area assignment system for assigning a font load area for storing font data and a bit map area for storing image data in the memory area with a predetermined capacity, wherein when a part of the memory area defined to be assigned for the bit map area is overlapped on a part of the font load area, it is judged whether or not the font data stored in the overlapped area is a secondary data which can be recovered by converting a primary data, and in case the font data is a secondary data, the overlapped area is assigned for the bit map area.

The features of the present invention which are believed to be novel are set forth with particularity in the appended claims. The present invention together with further objects and advantages thereof may best be understood with reference to the following detailed description, taken in conjunction with the accompanying drawings.

BRIEF DESCRIPTION OF THE DRAWINGS

The drawings show an embodiment of the present invention, wherein

FIG. 7 is a flow chart showing a load down process of font data, FIGS. 8(a) and 8(b) are diagrams showing a priority table and a size table respectively, FIGS. 9(a) to 9(c) are diagrams showing an assignation of the memory area.

DETAILED DESCRIPTION OF THE PREFERRED EMBODIMENT

An embodiment of the present invention will be explained hereinafter with reference to the attached drawings.

Figure 1:
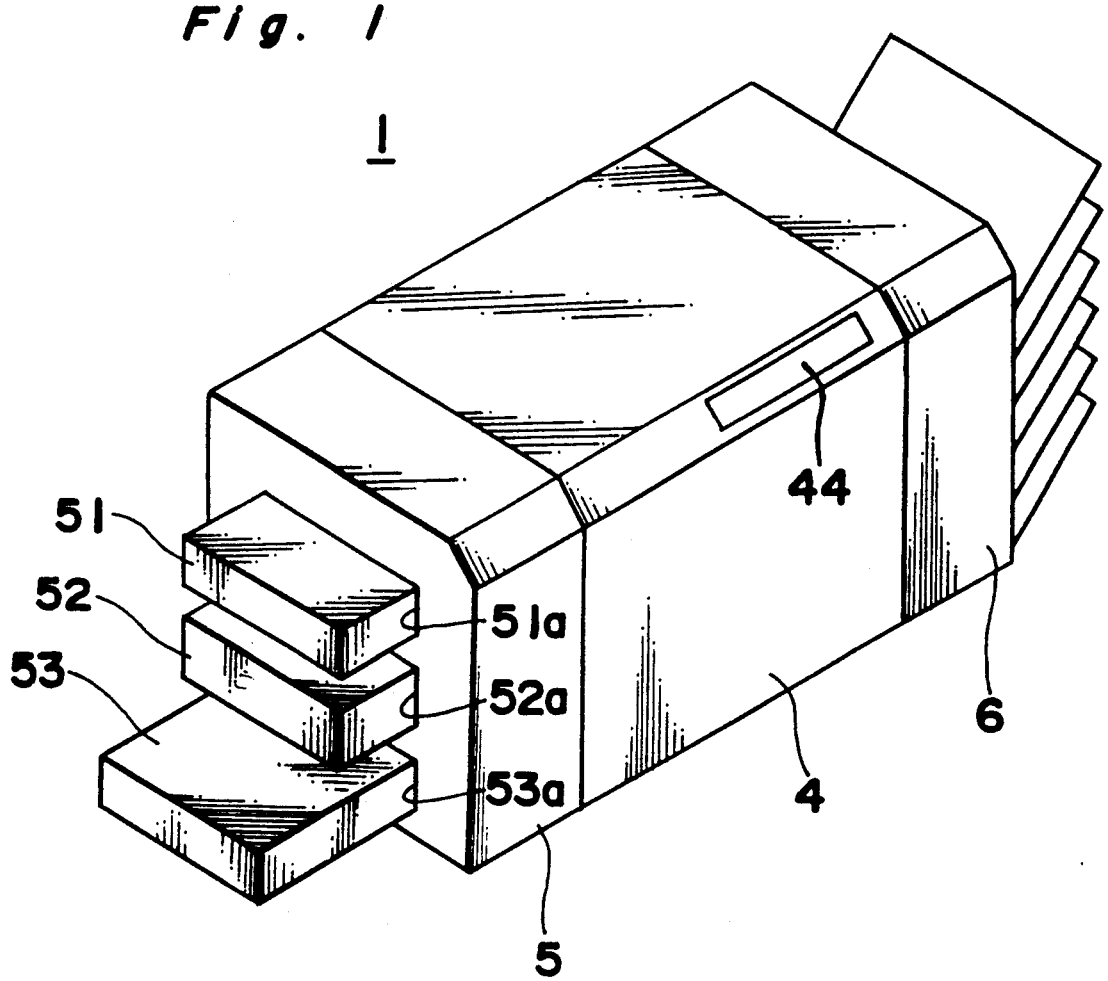
FIG. 1 is a schematic perspective view showing an outline of a laser printer.

As shown in FIG. 1, a laser printer 1 comprises a print engine unit 4 including a photosensitive member, a developing unit, a laser optical system for exposure and an image data processing unit 10 to be described later which are used for forming an image through an electrophotographic process, and further comprises an automatic paper feeding unit 5 and a sorter unit 6. In the automatic paper feeding unit 5, an upper paper feeding cassette 51, a middle paper feeding cassette 52 and a lower paper feeding cassette 53 are respectively attached to an upper paper feeding opening 51a, a middle paper feeding opening 52a and a lower paper feeding opening 53a defined in the left side of the automatic paper feeding unit 5 with their end portions of the cassettes 51 to 53 engaged therein, and one of the paper feeding cassettes 51 to 53 is selected and the printing paper disposed in said selected cassette is fed from the selected cassette to the print engine unit 4. The upper and middle cassettes 51 and 52 are detachable, and the size of the paper set in each cassette is fixed to each of the cassettes. The lower paper feeding cassette 53 is semi-fixedly attached to the lower paper feeding opening 53a, in which the printing paper of a specific paper size selected among some kinds of paper size are accommodated. In each of the paper feeding cassettes 51 to 53, there is provided a sensor (not shown) composed of such as a reed switch, and when one of the paper feeding cassettes is attached to the corresponding paper feeding opening defined in the paper feeding unit 5, the size of the printing paper accommodated in the selected paper feeding cassette is detected and in the image data processing unit 10 there is established a size table ST showing the correspondence between the respective paper feeding openings 51a to 53a and the printing paper sizes as shown in FIG. 8(b) and the size table ST is stored in the RAM 17. The image data processing unit 10 selects a suitable paper feeding opening among the paper feeding openings 51a to 53a corresponding to the desired paper size with reference to the size table ST.

On the front surface of the top portion of the print engine unit 4 there is provided an operation panel 44 for operating the laser printer 1.

Figure 2:
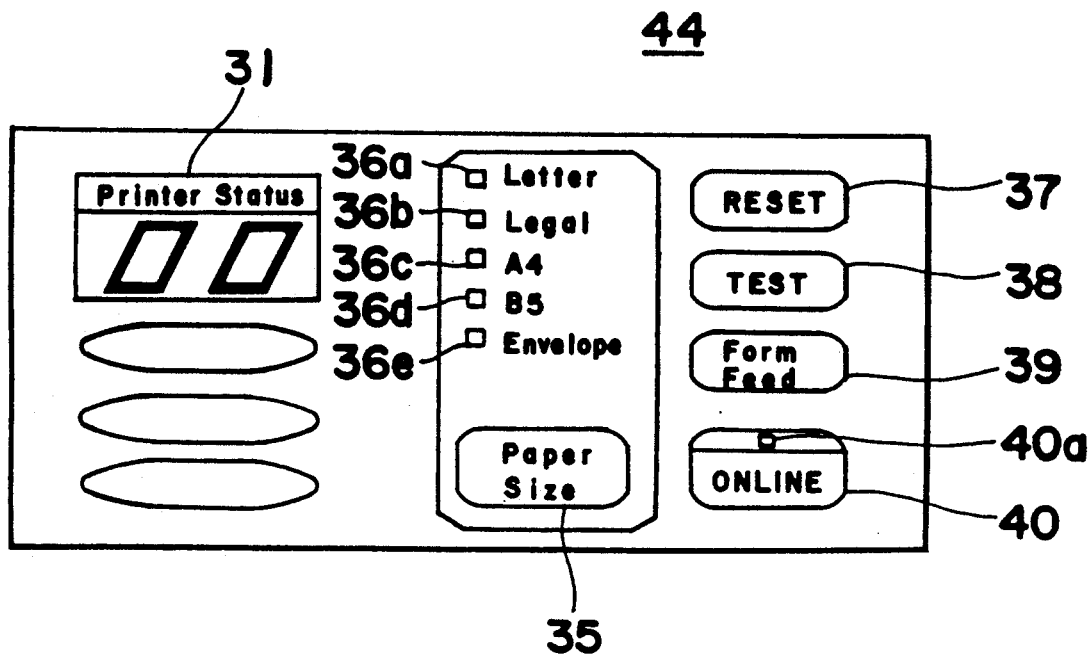
FIG. 2 is a front view of an operation panel.

As shown in FIG. 2, a light emitting diode (referred to as LED hereinafter) 31 of a seven-segment type displays the status of the operation of the laser printer 1 by displaying a coded signal. One of the paper feeding cassettes 51 to 53 is selected by operating a paper size selecting key 35 and one of paper size display LEDs 36a to 36e is turned on in accordance with the size of the paper accommodated in the selected paper feeding cassette In the initializing period when the electric power is supplied, the lower paper feeding opening 53a is selected first, and when the paper size selecting key 35 is operated to be input, the respective paper feeding openings 51a to 53a are selected in turn of the lower to the upper to the middle to the lower ... in accordance with the order of priority as shown by a priority table YT which is previously programmed as shown in FIG. 8(a). Reference numeral 37 denotes a reset key for initializing the printer 1, reference numeral 38 denotes a test key for testing the printing operation of the printer 1, and reference numeral 39 denotes a form feed key for discharging an internal image data. An on-line key 40 is provided for temporarily stopping the process of various parts of the printer 1, and when the process is stopped, a display LED 40a is turned off.

Figure 3:
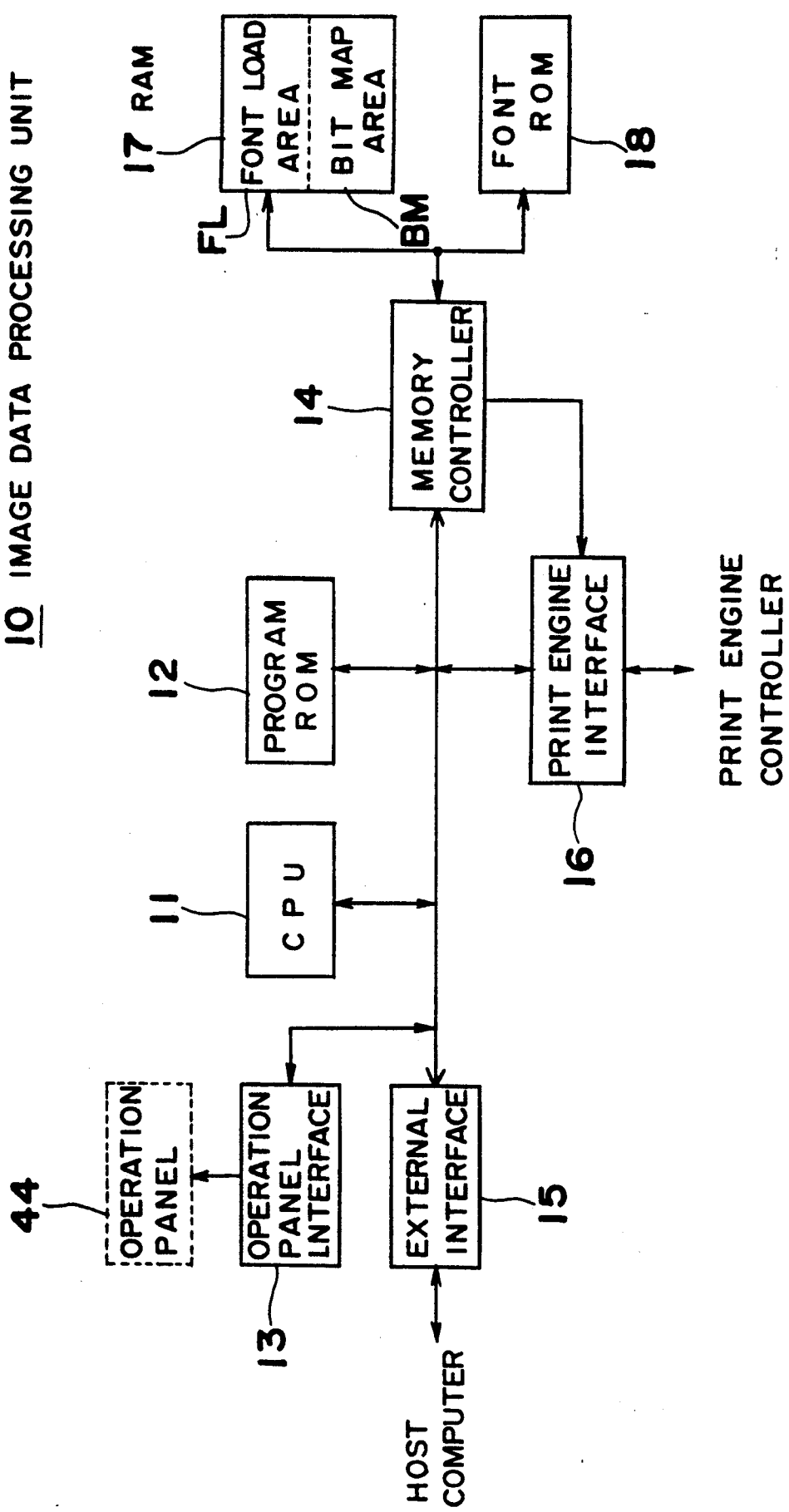
FIG. 3 is a block diagram showing a constitution of an image data processing unit of the laser printer.

FIG. 3 shows a constitution of the image data processing unit 10 provided in the laser printer 1.

The image data processing unit 10 comprises:

a central processing unit (referred to as CPU hereinafter) 11 composed of a microcomputer for controlling the operation of the entire parts of the image data processing unit 10, a program ROM (read only memory) 12 for storing programs for processing the data, an operation panel interface 13 connected to the operation panel 44, a RAM (random access memory) 17 utilized as a bit map memory for storing various kinds of data as to be described later, a font ROM 18 in which predetermined font data have been previously written, a memory controller 14 for controlling the RAM 17 and font ROM 18, an external interface 15 connected to an external device such as a host computer, and a print engine interface 16 connected to a print engine controller for controlling an electrophotographic process of the printer 1.

When an image data is fed from the host computer to the image data processing unit 10 through the external interface 15, the image is depicted in a bit map area BM in the RAM 17 on the basis of the image data under the control of the memory controller 14. In the image forming by the image data, there are picture image depict such as a line and circle and/or a font image depict which is formed by the font data read out of the font ROM 18 or RAM 17.

In the printing operation, the memory controller 14 reads out the respective image data from the bit map area BM in the order of the storage of the image elements in the memory synchronizing with the synchronizing signals sent from the print engine controller (not shown) in response to a print starting code signal sent from the host computer so that the read out image data are transmitted to the print engine controller through the print engine interface 16.

In the print engine controller, the image forming operation is controlled for forming an image of a predetermined image size with a margin in the peripheral portion on the printing paper fed from the automatic paper feeding unit 5, wherein the image forming operation is performed through a known electrophotographic process for forming an electrostatic latent image on the photosensitive member by turning the laser light source on and off in response to the image data.

The font data stored in the font ROM 18 may consist of pattern font data and code font data. The pattern font data represents the shape of the characters and symbols corresponding to the images represented in a manner of dotted pattern and the code font data (i.e, internal primary data) consisting of such as an outline font (vector font) data representing only an outline of a character and/or symbol and of compression font data for reducing the length of the data. When the outline font data of the code font data is used for printing, there can be easily formed an image including such as a modified character and enlarged character with a high quality.

Moreover, when other font data is needed for printing other than the font data stored in the font ROM 18, the necessary font data of an external primary data consisting of pattern font data or code font data may be loaded down from the host computer to the RAM 17.

When the image data is depicted in the bit map area BM based on the code font data of the internal or external primary data, it is required to perform a calculation process for calculating the number dots or picture plastering, so that the speed of the image depiction is lowered. Therefore, in order to speed up the image depiction of the image data in the bit map area BM, a font converting process may be performed by the CPU 11 during such as a waiting period before the printing operation, so that the code font data of internal or external primary data is previously converted to the pattern font data and the pattern font data may be stored in the RAM 17 as a secondary data.

Figure 4:
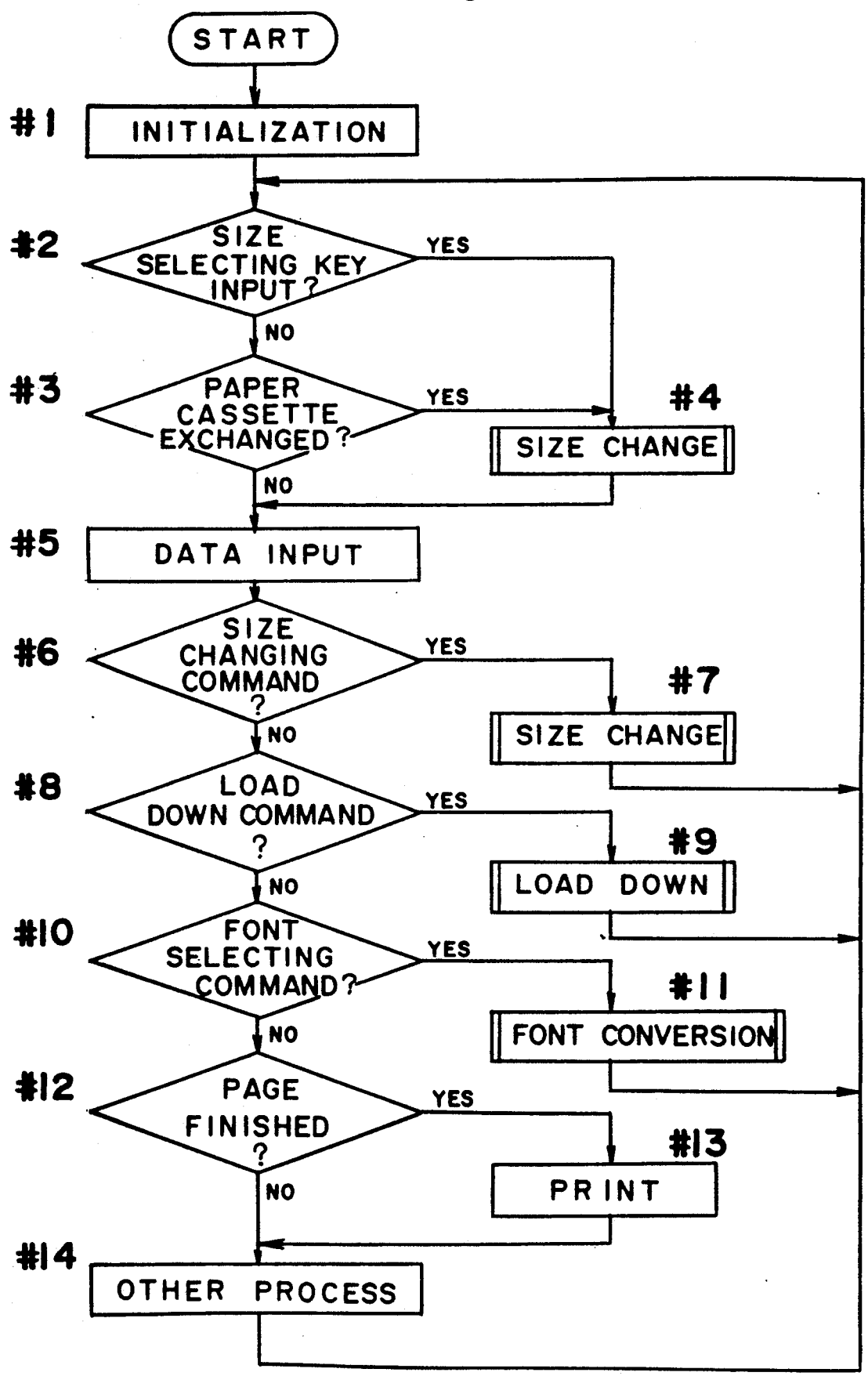
FIG. 4 is a main flow chart showing a control process of a central processing unit CPU 11.

FIG. 4 is a main flow chart showing a process of a control operation of the CPU 11.

As shown in FIG. 4, the entire parts of the printer 1 are initialized by the CPU 11 in the step #1. In the subsequent step #2, it is judged whether or not the paper size selecting key 35 is operated, and if the paper size selecting key 35 is not operated, the program goes to the step #3 and it is judged whether or not the paper feeding cassettes 51 to 53 or the printing paper in the cassettes are exchanged. If the paper size selecting key 35 is operated in the step #2, or the paper feeding cassette or the paper size in the cassette is exchanged in the step #3, a size changing process routine is performed in the step #4 to be described later.

Subsequently in the step #5, the image data is applied from the host computer to the image data processing unit 10. If the applied data is a size changing command signal, the program goes to the step #7 and the size changing processing routine is performed. If the applied data is not the size changing command data, the program goes to the step #8 and it is judged whether or not the input data is a load down command data, and if the input data is a load down command data, the program goes to the step #9 and the load down process is performed as to be described later. If the input data is not a load down command data, the program goes to the step #10 and it is judged whether or not the input data is a font selecting command data, and if the input data is a font selecting command data, the program goes to the step #11 and a font converting process is performed as to be described later. If the input data is not a font selecting command data, the program goes to the step #12 and it is judged whether or not a signal indicating the final data of the data corresponding to one page is sent from the host computer, and if such a final data signal is received by the CPU 11, the program goes to the step #13 and a printing operation is performed.

Subsequently in the step #14, other processes are performed, and then the program returns to the step #2.

Figure 5:
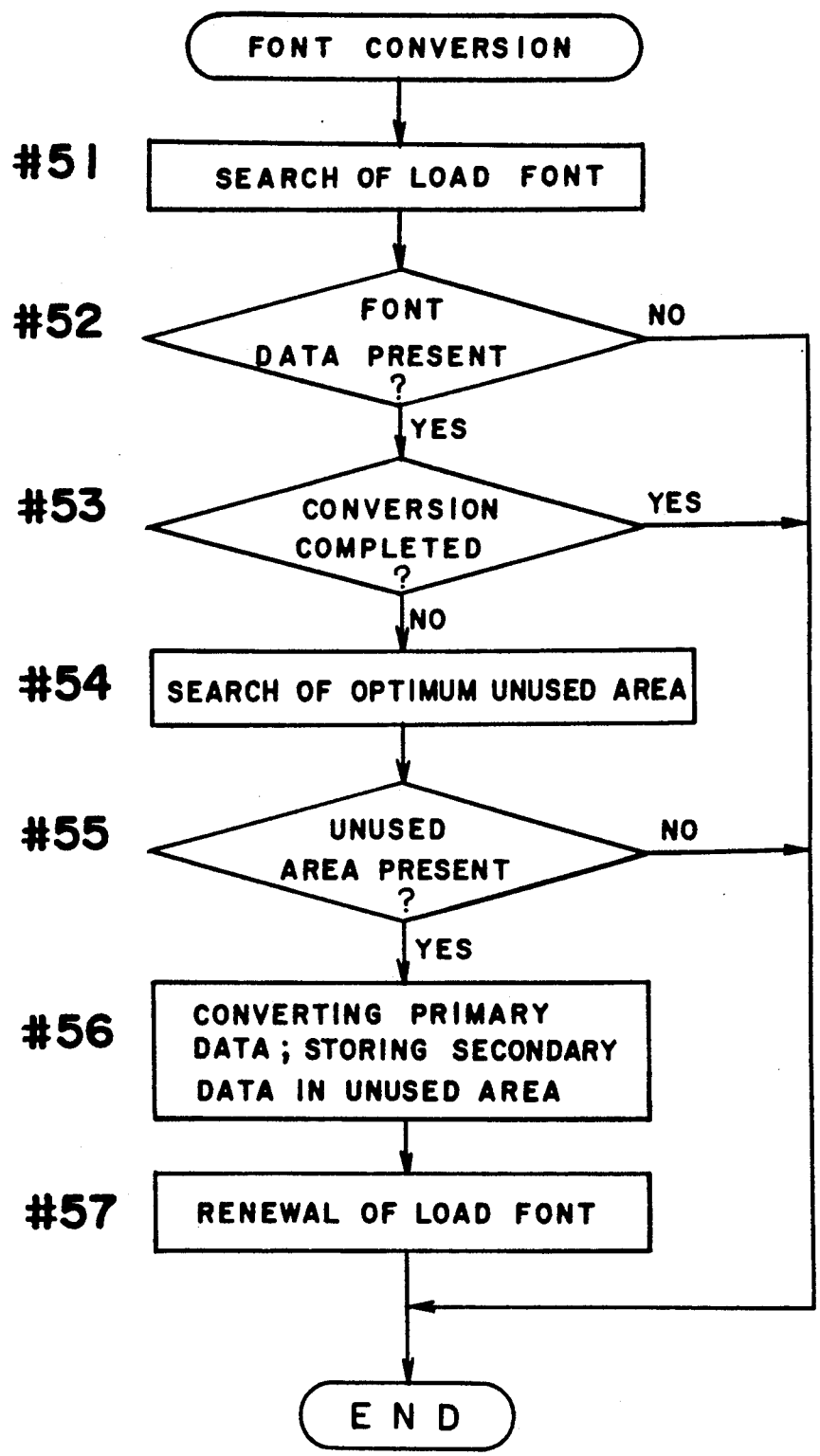
FIG. 5 is a flow chart showing a font converting process.

FIG. 5 shows a flow chart of the font converting process, which is started when a specific code font data is designated from the host computer among the internal or external primary code font data.

In the first step #51, a search operation is performed for searching a coded load font data which is controlled by the memory controller 14. The coded load font data consist of an attribute data which represents a style and size of a character and represents whether the font data is a code font data or a pattern font data, a storing position data which represents whether the data is stored in the RAM 17 or font ROM 18 and represents the head address of the data storing area, a data length data representing the total size of the data, and a source data representing whether the data is a font data loaded down in the RAM 17 or a font data stored in the font ROM 18 and representing whether the data is a primary data or secondary data.

In the step #52, it is judged whether or not there is a designated font data depending on the attribute data, and if such a designated font data is not present, the process is finished. If such a designated font data is present, the program goes to the step #53 and it is judged depending on the source data whether the designated font data is a primary code font data or a secondary pattern font data converted from the primary code font data.

If it is judged in the step #53 that the font converting process is not completed, i.e., in case that the designated font data is a primary data, the program goes to the step #54 and the optimum unused area in the RAM 17 is searched, and subsequently in the step #55 it is judged whether or not there is an unused area capable of accommodating the secondary data of a data length when converted from the primary font data, and if such an optimum unused area is not present in the RAM 17, the font converting process is finished. If such an optimum unused area is present in the RAM 17, the primary code font data is converted into the secondary pattern font data and the secondary pattern font data is stored in the unused area in the step #56.

Subsequently in the step #57, the load font data is renewed and then the code of the load font data is registered, which represents on the basis of the source data that the data stored in the unused area in the RAM 17 is a secondary data.

Figure 6:
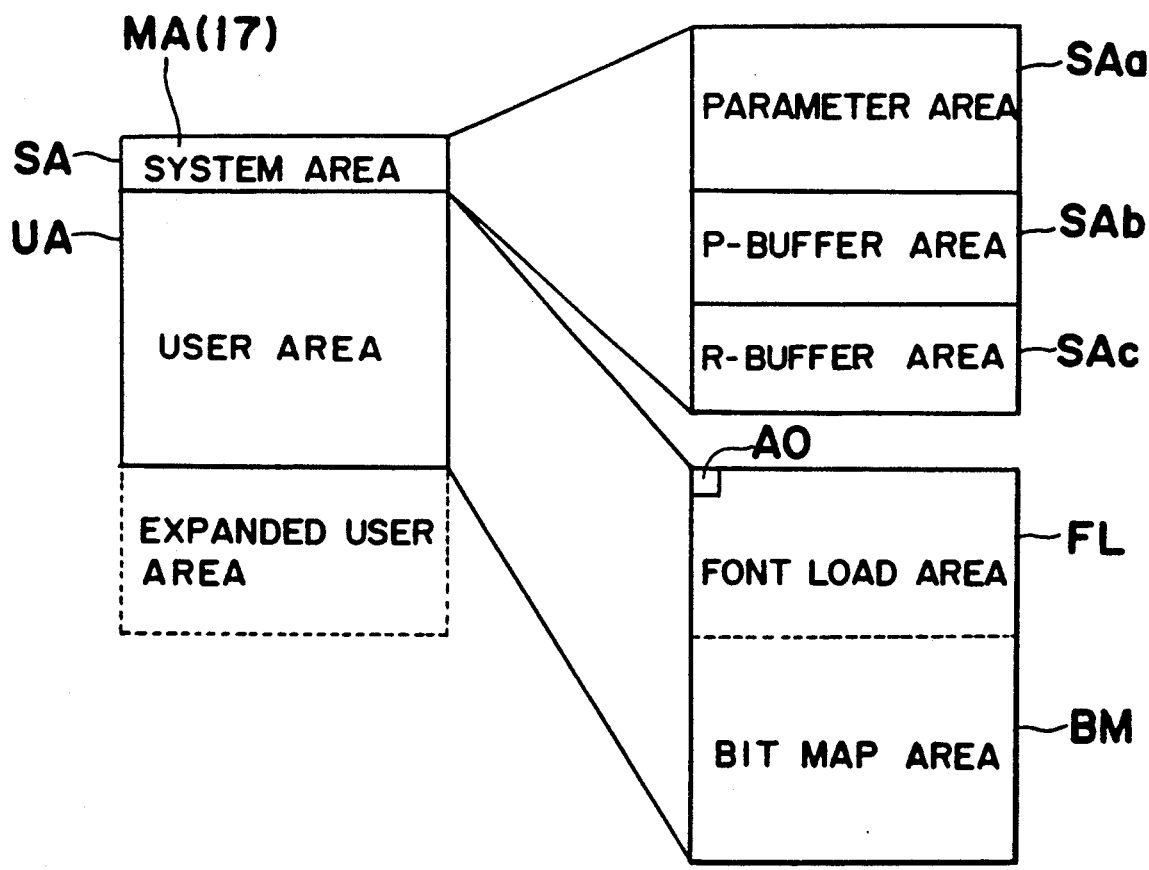
FIG. 6 is a diagram showing a constitution of a memory area of RAM shown in FIG. 3.

FIG. 6 shows a constitution of a memory area MA of the RAM 17.

The memory area MA is constituted of a single or a plurality of RAM chips and is formed of a memory space which can be accessed by one address system, and the memory space is divided into a system area SA for storing the control data of the CPU 11 and a user area UA taken in conjunction with the image data, from the viewpoint of the sorts of the data to be stored in the RAM 17.

In the system area SA there are provided a parameter area SAa for storing such as a parameter for calculation process performed by the CPU 11, a P-buffer area SAb for storing intermediate codes corresponding to command codes for various control operations applied from the host computer, and a R-buffer area SAc for communicating with the host computer.

On the other hand, the user area UA has a font load area FL for storing font data comprising external primary font data of pattern font data or code font data loaded down from the host computer when needed for printing and secondary pattern font data converted from the code font data of the external primary data and from the internal primary data and has a bit map area BM as an imaginary image field on which the image data is depicted.

The font load area FL and the bit map area BM are assigned in such a manner that the areas FL and BM are appropriately expanded or reduced in accordance with the amount of the font data and image data to be stored, so that the memory area MA with a predetermined capacity can be effectively utilized.

That is to say, in an initializing the image data processing unit when the electric power is supplied, for example, a lower half area designated by the consecutive addresses in the latter half of the user area UA are assigned for the bit map area BM with a capacity for storing the data corresponding to the data on the A4 size paper and the upper half area of the user area UA is assigned for the font load area FL. In the case that the volume of the image data is less than that in the initialization such as a case of printing the image on a sheet of paper smaller than A4 size paper or printing a minified image of an image data, the bit map area BM is reduced and the font load area FL is expanded. On the contrary, in the case of printing an image on a sheet of paper larger than A4 size paper or printing a magnified image on a sheet of paper when the volume of the stored font data is so little that there is an available memory area which is not yet used or a data deletable area, the bit map area BM can be expanded.

When the font data is stored in the font load area FL, in other words, when the font load area FL assigned for storing the font data is used, the font data are sequentially stored in the font load area FL in the user area UA in the order from the head address area A0 to the subsequent address area one by one. The user area UA can be expanded by providing more RAM chips.

FIG. 7 shows a flow chart of a process for loading down the font data.

In the step #41, there is registered an attribute of a font data to be loaded down as a load font information, and in the subsequent step #42 the optimum area is searched, wherein the optimum area means an unused area with a minimum capacity larger than the capacity for storing the font data for all of the characters in the corresponding font data.

It is judged in the step #43 whether or not there is an optimum unused area in the assigned font load area FL, and in case there is no unused area, the font data of all of the characters subsequently applied from the host computer are skipped over and disused in the step #46 and then the process is finished.

In case it is judged in the step #43 that there is an unused area in the font load area FL, the program goes to the step #44 and the font data are stored in the unused area in the font load area FL and subsequently in the step #45 the load font information are renewed and then the process is finished.

Next, a method of assigning the memory area MA of the RAM 17 is explained with reference to FIGS. 9 and 10 when the change of the image size is directed.

The paper size changing process is started when one of the paper feeding openings 51a to 53a is selected by operating the size selecting key 35 or when a paper feeding cassette attached to the selected paper feeding opening is exchanged or the paper accommodated in the cassette is exchanged with paper of other size or when an order signal is applied from the host computer to the CPU 11 for commanding the change of the paper size or image size.

Figure 10:
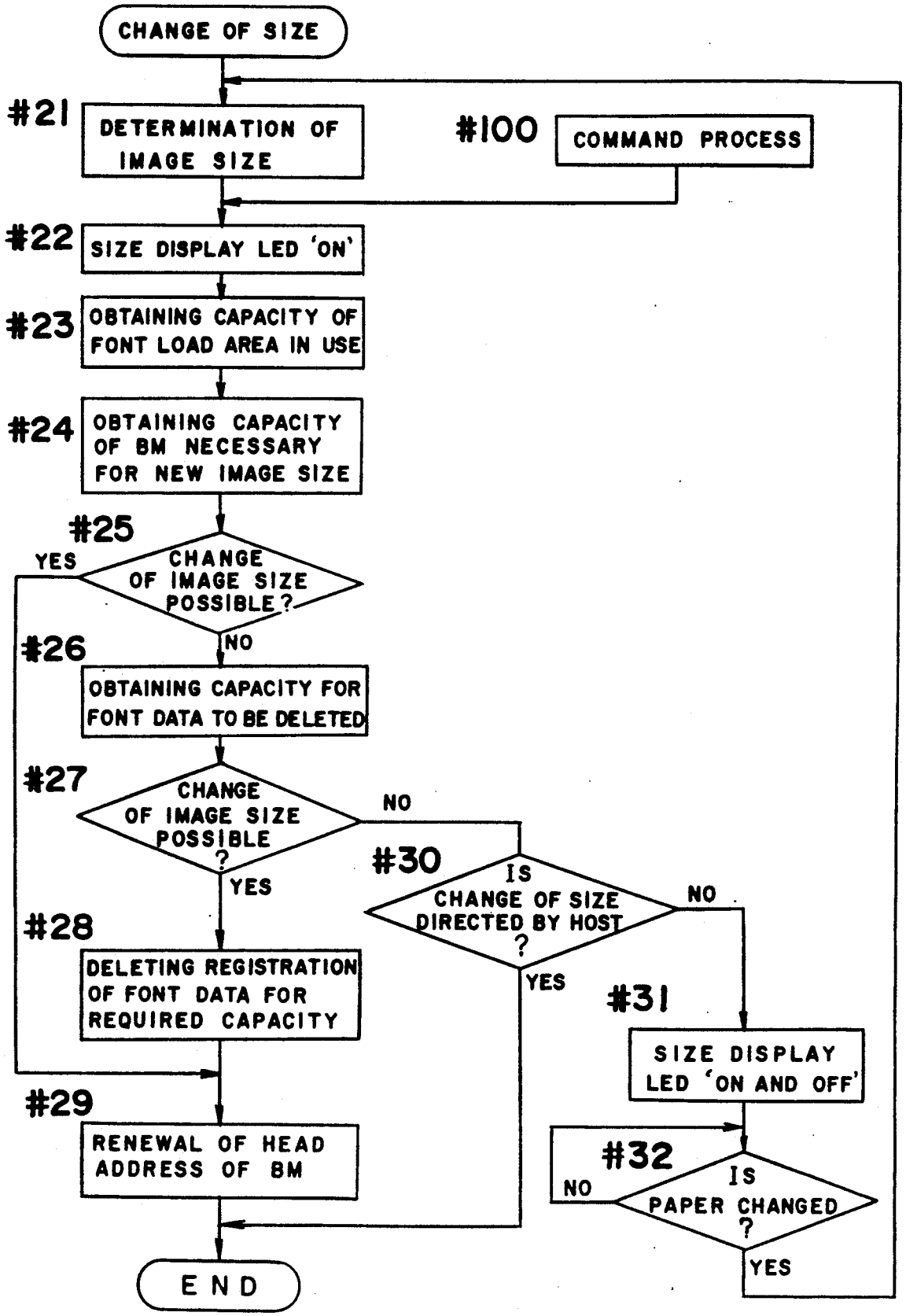
FIG. 10 is a flow chart showing a process for changing a size of printing paper.

As shown in FIG. 10, first in the step #21, a new image size is determined. That is to say, when the size selecting key 35 is operated to select a new paper size, the subsequent paper feeding opening is determined with reference to the priority table YT shown in FIG. 8(a) and a paper feeding opening selecting signal for switching the paper feeding opening is applied from the host computer to the print engine controller through the print engine interface 16 so that the paper size corresponding to the newly selected paper feeding opening is obtained with reference to the size table ST shown in FIG. 8(b). The print engine controller so controls the automatic paper feeding unit 5 as to switch the paper feeding opening depending on the paper feeding opening selecting signal mentioned above.

Moreover, in case that a paper feeding cassette is newly attached to the selected paper feeding opening or the paper in the cassette is exchanged for another paper size, the size of the paper set in the paper feeding cassette is detected by a detection signal from the sensor mentioned above.

In the subsequent step #22, one of the paper size display LEDs 36a to 36e is turned on in correspondence to the paper size obtained in the process of the step #21.

In case that a size changing command signal is applied from the host computer, an image size is newly determined on the basis of the command signal in the step #100 and then the program goes to the step #22 and one of the LEDs 36a to 36e corresponding to the designated image size is turned on.

In the next step #23, the capacity of the font load area FL now in use for storing the font data is obtained depending on the load font information.

In the case shown in FIG. 9(a), font data A an B of external primary data are loaded down from the external device into the memory area MA of the RAM 17 in the order from the head address to the subsequent address, and immediately after the area storing the font data B there is an unused area EA due to such as deletion of data and in the areas subsequently lower adjacent to the unused area EA are stored font data C and D of secondary data. Therefore, in this case, the area of a capacity m1 in the range from the head address corresponding to the font data A to the last address corresponding to the font data D is now in use.

Subsequently in the step #24, the capacity m2 of the bit map area BM after changing the image size is obtained, which is necessary for the depiction of the image of the image size corresponding to the newly set paper size as shown in FIG. 9(c).

In the subsequent step #25, it is judged whether or not it is possible to change the image size. That is to say, it is judged whether or not the capacity m3 which is obtained by subtracting the capacity m1 of the font load area FL in use from the capacity m0 of the memory area MA (m3=m0-m1) is larger than the capacity m2 of the bit map area BM which is necessary for depicting the image of the newly directed image size.

In case it is judged in the step #25 that it is possible to change the image size, i.e., the capacity m3 is larger than the capacity m2, the unused area in the font load area FL is assigned for the bit map area BM so as to extend the bit map area BM, thereby enabling to change the image size, and in this case the program goes to the step #29.

In case it is judged in the step #25 that it is impossible to change the image size, i.e., the capacity m3 is smaller than the capacity m2, in other words, in case the area of a capacity bm assigned for a new bit map area BM is overlapped with the font load area FL, the program goes to the step #26 and in the font load area FL including the overlapped area WA adjacent to the bit map area BM as shown in FIG. 9(a), the capacity of the area storing the data to be deleted is obtained.

If the font data C is a secondary pattern font data converted from the internal primary data as described above and the font data D is a secondary data converted from the external primary font data A, since the font data C and D can be recovered by converting the internal or external primary data when necessary, there is no difficulty in a printing operation even though the font data C and D are once deleted.

The area corresponding to a capacity m4 including the areas storing the font data C and D and including the unused area EA in the font load area FL can be assigned in addition for a part of the bit map area BM, thereby expanding the bit map area BM.

It is also judged in the step #27 whether or not it is possible to change the image size. That is to say, it is judged whether or not the total capacity of m3 and m4 is larger than the capacity m2 of the bit map area BM which is needed for depicting the image of the directed image size, in other words, whether or not an inequality (1) is satisfied.

$$m3 + m4 \geq m2 \ldots \quad (1)$$

If it is judged in the step #27 that it is possible to change the image size, i.e., the inequality (1) is satisfied, the program goes to the step #28 and the deletable font data C and D are deleted in the order from the lower font data D to the adjacent font data C, in other words, the registration of the load font information is deleted until there is secured an area required for storing the image data of a changed image size in the bit map area BM of the capacity m2. In the example shown in FIGS. 9(a) to 9(c), when the registration of the font data D is deleted, as shown in FIG. 9(b), the capacity of the font load area FL in use is m5 and since the capacity m6 (=m0-m5) which can be assigned for the bit map area BM is larger than the capacity m2 of the bit map area BM, therefore, it is not required to delete the registration of the font data C.

Subsequently in the step #29, the head address of the bit map area BM is renewed and the area corresponding to the capacity m2 in the lower half portion of the memory area MA is assigned for a new bit map area BM as shown in FIG. 9(c), thereby expanding the bit map area BM than before.

If it is judged in the step #27 that it is impossible to change the image size, i.e., in case of $m3 + m4 < m2$, for example, in the case that the font data D is an indeletable font data such as an external primary data which can not be recovered from the font data stored in the laser printer 1, the program goes to the step #30 and it is judged whether or not an image size changing signal is sent from the host computer.

If it is judged in the step #30 that the change of the image size is directed by the host computer, the image size changing direction sent from the host computer is ignored in practice and the size changing process is finished. In this case, the image of the original image size is formed by applying such as a print starting code.

If it is judged in the step #30 that the change of the image size is not directed by the host computer, i.e., in case the size changing process is started by detecting the change of the printing paper size performed by the operator, the program goes to the step #31 and the paper size display LED turned on in the step #22 is turned on and off, so that the operator is informed that the image size can not be changed to that determined in the step #21 and then the program goes to the step #32.

The operator is informed by monitoring the paper size display LED turned on and off that it is necessary to exchange the printing paper. It is judged in the step #32 whether or not the paper is exchanged by the operator, and when the change of the paper is detected, the program returns to the step #21 and the paper size display LED being turned on and off is turned off in the step #22.

Therefore, in the case that it is impossible to change the image size, the size changing process is continued and a printing operation is not performed until the paper size is changed to suitable one by the operator, thereby preventing the image from being printed with an image size different from that directed by an operator.

In the example of the image size changing process mentioned above, when it is judged in the step #30 that the change of the image size is not directed by the host computer, an alarm may be given with a paper size display LED turned on and off for a predetermined period or instead of turning on and off the size display LED, thereby informing the operator that the image size can not be changed to the image size obtained in the step #21. Moreover, it may be possible to transmit a signal to the host computer for informing it impossible to change the image size.

In the example, although it is judged whether or not the font data stored in the font load area FL is deletable, and if the font data is a deletable secondary data, the secondary font data is deleted so that the font load area FL is reduced, but a new font load area FL and a bit map area BM are assigned in accordance with the status of using the user area UA and an alarm may be given for informing that it is impossible to change the image size, instead of deleting the secondary font data to reduce the font load area FL. That is to say, the process of the steps #26 and #27 shown in FIG. 10 may be omitted and in this case, if it is judged in the step #25 that it is impossible to change the image size, the program skips over to the step #30.

Moreover, in the example mentioned above, although the final pattern font data directly corresponding to the image data was explained as the secondary data which can be recovered by converting the primary data, if in the font load area FL is stored an intermediate font data situated midway of the conversion from the primary code font data stored in the laser printer to the secondary pattern font data, the intermediate font data can be also dealt with as a recoverable secondary data.

Moreover, in the example mentioned above, although the explanation is made about the case that the font ROM 18 having a predetermined font data previously written in is provided, necessary font data may be loaded down from the host computer to the font load area FL instead of providing the font ROM 18.

Another example of the image size changing process is explained with reference to FIG. 11 which is similar to FIG. 10 except omitting the step #32.

Figure 11:
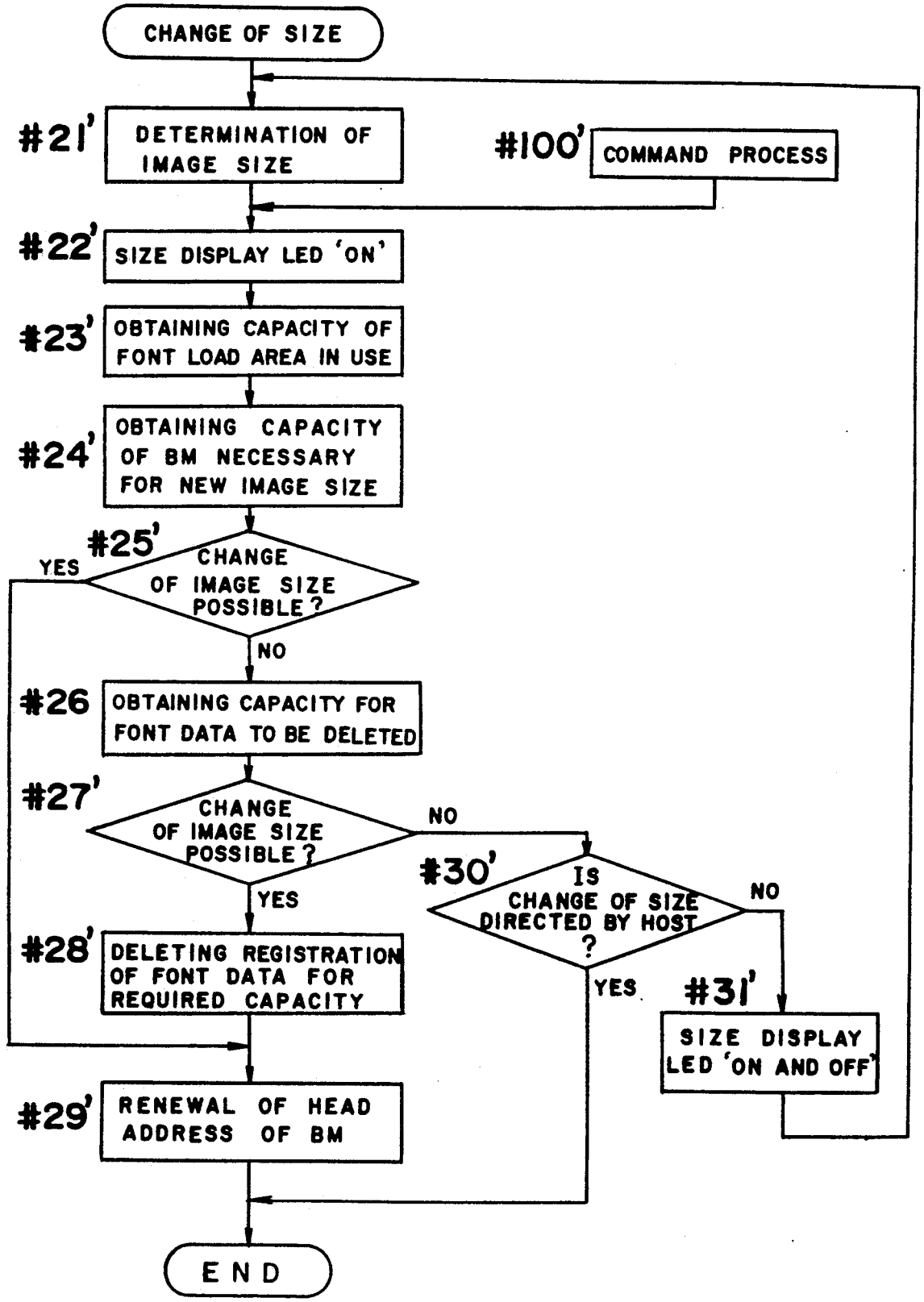
FIG. 11 is a flow chart showing another example of a process for changing a size of printing paper.

In FIG. 11, if it is judged in the step #30' that the change of the image size is not directed by the host computer, in other words, if the size changing process is started by operating the size selecting key 35 to be input, the program goes to the step #31' and the size display LED turned on in the step #22' is turned on and off for a predetermined time, thereby informing the operator that the image size can not be changed to the image size obtained in the step #21' and then the program returns to the step #21'. Therefore, in this case, the process is repeated from the step #21' to the step #31' until a new image size is selected to change the present image size.

Accordingly, even though it is impossible to print the image on the paper of a paper size selected by the operator, a paper size capable of printing the image is automatically selected, so that it is not needed for the operator to re-select the paper size, and also the operator can be informed by monitoring the size display LED turned on and off that the printing operation is performed on the paper of a paper size different from the directed paper size.

In the example mentioned above, although the explanation is made about the assignment system for assigning the memory area MA employed in the laser printer 1 for forming a hard copy image, the present invention can be also applied to an image forming device such as a display unit displaying an image on a display screen.

As described above, according to the present invention, since the bit map area and font load area are appropriately expanded or reduced respectively so as to be assigned to the user area in the memory area, therefore, the memory area can be effectively utilized so that it becomes possible to provide a small sized memory device, preventing the font data and image data from being destroyed.

What is claimed is:

1. A device for forming an image on the basis of an image data comprising:
    memory means having a memory area with a predetermined memory capacity,
    control means for assigning a font load area for storing font data and assigning a bit map area for storing said image data in said memory area, said font data including secondary data obtained by converting primary data stored in said memory area or other memory area,
    first judging means for judging whether or not it is impossible to assign the bit map area for storing image data of a designated image size to an area in said memory means except for the area assigned for said font load area,
    second judging means for judging whether or not it is possible to assign said bit map area to the areas including said area except the area assigned for said font load area and including a part of said font load area storing only secondary data, and
    means for enabling said control means to assign the font load area in case said second judging means judges it possible, both the area except the area assigned for said font load area and the area storing only said secondary data in the font load area.

2. The device according to claim 1, wherein said primary data are stored in said font load area.

3. The device according to claim 1 further comprising font memory means 18 for storing said primary data.

4. The device according to claim 1, wherein in case it is judged it impossible to assign said bit map area to the areas including said area except the area assigned for said font load area and including the area storing only secondary data, said control means 11 suppresses an operation for forming a new image.

5. The device according to claim 1 further comprising alarm means which gives an alarm when it is judged it impossible to assign said bit map area to the areas including said area except the area assigned for said font load area and including the area storing only secondary data.

6. The device according to claim 1 further comprising means for determining, when it is judged it impossible to assign said bit map area to the areas including said area except the area assigned for said font load area and including the area storing only secondary data, the image size of the image corresponding to the capacity of the bit map area which can be assigned to the area except the area assigned for said font load area or to the areas including the area except the area assigned for said font load area and including the area storing only secondary data, and display means for displaying the image size determined by said determining means.

7. The device according to claim 1 further comprising selecting means for selecting said image size, wherein when it is judged it impossible to assign said bit map area to the areas including said area except the area assigned for said font load area and including the area storing only secondary data, said control means changes the image size selected by said selecting means.

8. A device for forming an image on the basis of an image data comprising:
    memory means having a memory area with a predetermined memory capacity;
    memory control means for assigning a font load area for storing font data and a bit map area for storing said image data in said memory area, said font data including primary data and secondary data obtained by converting said primary data;
    image size designating means for designating the size of said image;
    capacity designating means for obtaining the memory capacity of the bit map area necessary for storing the image data corresponding to said image on the basis of the image size designated by said image size designating means; and
    judging means for judging whether or not it is possible to assign the bit map area corresponding to the image size designated by said image size designating means on the basis of the memory capacity obtained by said capacity designating means and on the basis of the entire memory capacity of said memory area and on the basis of the memory capacity of the area in which said primary data are stored,
    wherein when said judging means judges it possible to assign said bit map area in said memory area, said memory control means assigns the bit map area to the area in which said secondary data are stored.

9. The device according to claim 8 further comprising means for prohibiting an image forming operation for forming a new image when said judging means judges it impossible to assign said bit map area in said memory area.

10. The device according to claim 8 further comprising alarm means which is operated when said judging means judges it impossible to assign said bit map area in said memory area.

11. The device according to claim 8 further comprising:
    size setting means for setting the image size corresponding to the capacity of the bit map area which can be assigned in said memory area when said judging means judges it impossible to assign the bit map area in said memory area; and
    display means displaying said image size set by said size setting means.

12. The device according to claim 8 further comprising means for automatically changing the image size designated by said image size designating means when said judging means judges it impossible to assign said bit map area in said memory area.

13. A printer device for forming an image on a sheet of paper based on an image data comprising:

memory means having a memory area with a predetermined memory capacity;

memory control means for assigning a font load area for storing font data and a bit map area for storing said image data in said memory area, said font data including primary data and secondary data obtained by converting said primary data;

a plurality of paper feeding units for storing and feeding paper of different sizes respectively;

paper feeding unit selection means for selecting one unit of said paper feeding units;

first judging means for judging whether or not it is possible to assign the bit map area corresponding to the size of the paper stored in the paper feeding unit selected by said paper feeding unit selection means to the area having no font data stored; and second judging means for judging whether or not it is possible to assign the bit map area corresponding to the size of the paper stored in the paper feeding unit selected by said paper feeding unit selection means to the area having no primary data stored when said first judging means judges it impossible to assign said bit map area to said area having no font data stored;

wherein when said first judging means judges it possible to assign said bit map area to said area having no font data stored, the bit map area is assigned to said area having no font data by said memory control means, and when said second judging means judges it possible to assign said bit map area to said area having no primary data stored, the bit map area is assigned to said area having no primary data by said memory control means.

14. The device according to claim 13 further comprising:

prohibiting means which prohibits an operation for forming a new image when said first and second judging means judge it impossible to assign said bit map area;

alarm means which gives an alarm when said first and second judging means judge it impossible to assign said bit map area;

size setting means which sets the paper size for forming the image corresponding to the capacity of the bit map area which can be assigned in the memory area when said first and second judging means judge it impossible to assign said bit map area; and display means displaying the paper size set by said size setting means.

15. The device according to claim 13 further comprising control means controlling said paper feeding unit selection means to automatically select the paper feeding unit storing the paper of the paper size corresponding to the capacity of the bit map area which can be assigned in the memory area when said second judging means judges it impossible to assign said bit map area.

16. A memory area assignment method for assigning a font load area for storing font data and a bit map area for storing image data in a memory area with a predetermined memory capacity, wherein said font data includes secondary data obtained by converting primary data stored in said memory area or in another memory area, comprising:

a step of designating an area in said memory area for assigning the bit map area;

a step of judging whether or not the font data stored in an overlapped area is a secondary data which can be recovered by converting said primary data when the designated area for the bit map area is overlapped on the font load area; and a step of assigning the overlapped area for the bit map area when the font data stored in said overlapped area is a secondary data.

* * * * *